United States Patent [19]

Ohkumo et al.

[11] Patent Number: 4,805,751
[45] Date of Patent: Feb. 21, 1989

[54] SYSTEM FOR CONTROLLING A CLUTCH FOR A MOTOR VEHICLE

[75] Inventors: Hiroya Ohkumo, Koganei; Ryuzo Sakakiyama, Tokyo, both of Japan

[73] Assignee: Fuji Jukogyo Kabushiki Kaisha, Tokyo, Japan

[21] Appl. No.: 43,433

[22] Filed: Apr. 28, 1987

[30] Foreign Application Priority Data

Apr. 30, 1986 [JP] Japan .................................. 61-100321

[51] Int. Cl.⁴ .............................................. B60K 41/02
[52] U.S. Cl. ............................. 192/0.076; 192/0.096; 192/21.5; 192/103 R
[58] Field of Search ................. 192/0.032, 0.034, 0.07, 192/0.075, 0.076, 0.096, 21.5, 103 R

[56] References Cited

U.S. PATENT DOCUMENTS 4,449,620 5/1984 Sakakiyama ..................... 192/0.076

FOREIGN PATENT DOCUMENTS

| 0151038 | 8/1985 | European Pat. Off. |
|---|---|---|
| 11753 | 1/1985 | Japan ........................ 74/866 |
| 78122 | 5/1985 | Japan ........................ 192/0.075 |
| 78123 | 5/1985 | Japan ........................ 192/0.075 |
| 98230 | 6/1985 | Japan ........................ 192/0.075 |

Primary Examiner—Leslie A. Braun
Assistant Examiner—David A. Testardi
Attorney, Agent, or Firm—Martin A. Farber

[57] ABSTRACT

A system has a start mode in which clutch torque of the clutch increases with increase of speed of an engine of the motor vehicle, a lock-up engagement mode in which the clutch torque is increased, and a drag mode in which the clutch torque is reduced to produce a drag torque, one of the modes being selected in accordance with depression of the accelerator pedal and speed of the vehicle. When a vehicle speed detector does not produce a vehicle speed signal for a predetermined period in the start mode at engine speed higher than a predetermined speed, a fail-safe signal is produced. In response to the fail-safe signal, the system operates to keep clutch torque.

5 Claims, 7 Drawing Sheets

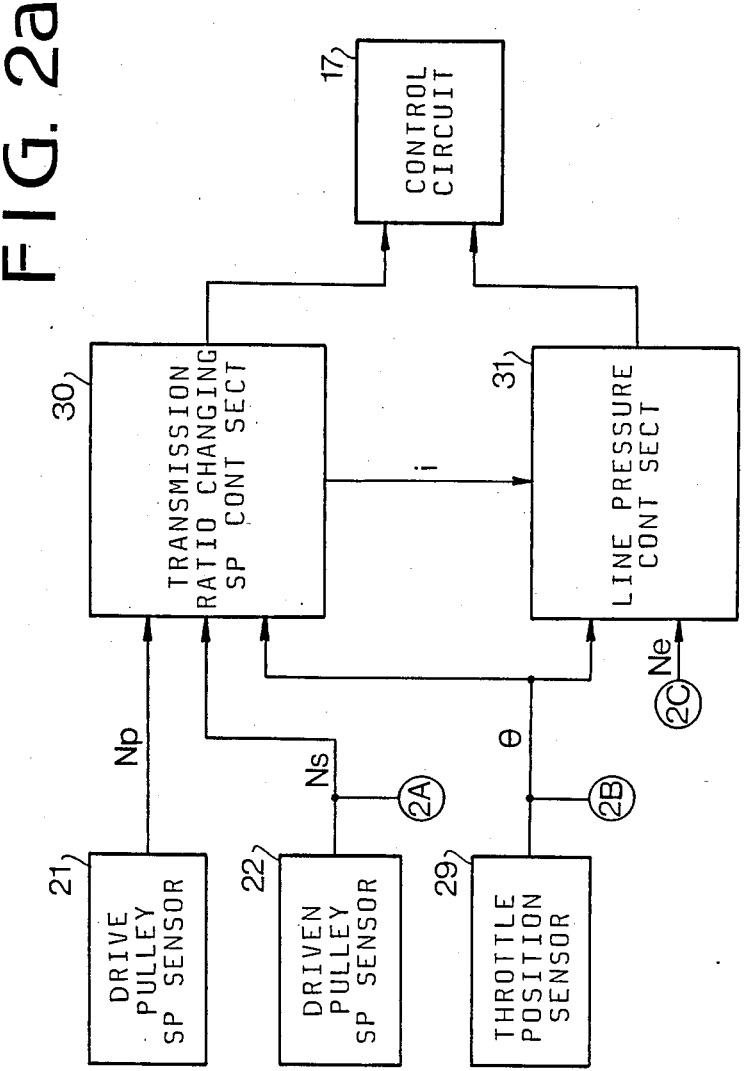

SYSTEM FOR CONTROLLING A CLUTCH FOR A MOTOR VEHICLE

BACKGROUND OF THE INVENTION

The present invention relates to a control system for an electromagnetic clutch for an automatic transmission of a motor vehicle.

An automobile provided with a continuously variable belt-drive transmission with an electromagnetic clutch is disclosed in EP-A No. 151038. The electromagnetic clutch of the transmission is controlled by a control system to provide various operational modes such as a starting mode of a vehicle, reverse excitation mode, drag mode, and mode of lock-up engagement. One of the modes is selected in accordance with a position of a selector lever and driving conditions to control the electromagnetic clutch.

In the reverse excitation mode, a small reverse current flows in a coil of the clutch to completely release a driven member of the clutch from a drive member. In the start mode, the clutch current is increased in proportion to engine speed to start the vehicle. In the drag mode, a small clutch current flows to produce a drag torque exerted on the driven member, thereby reducing clearances formed in the power transmitting system in disengagement state of the clutch. In the clutch lock-up engagement mode, a lock-up current in response to the depression of an accelerator pedal is provided for entirely engaging the clutch.

Particularly, when the vehicle speed exceeds a predetermined speed, the start mode is changed to the clutch lock-up engagement mode, and the clutch lock-up engagement mode is changed to the drag mode during release of the accelerator pedal, after zero current (FIG. 3).

In the control system, the vehicle speed signal is obtained by a sensor operatively connected to an output shaft of the transmission or to a speedometer. Therefore, if the vehicle speed signal is not produced because of the failure of the sensor, cutting of a cable for the speedometer, disconnection of a wiring harness, or short circuit to the ground, the control system does not properly control the clutch current. It will be understood that the fact that the vehicle speed is zero means the vehicle is at a stop.

For example, when the accelerator pedal is depressed, the drag mode changes to the start mode. However, the start mode is not changed to the clutch lock-up engagement mode. Although the vehicle is normally started, the clutch torque changes in proportion to the engine speed because of the start mode. In such a state, it may cause the clutch to slip during the driving in accordance with driving conditions after the start of vehicle. Further, it will cause the deterioration of the clutch by excessive high temperature due to the slipping.

When the accelerator pedal is released, clutch mode is changed to the drag mode. Accordingly, the engine braking is not effected because of disengagement of the clutch, which results in lack of safety.

Further in accordance with the depression and release of the accelerator pedal at higher vehicle speed, the clutch is engaged or disengaged, which aggravates the driving characteristics.

SUMMARY OF THE INVENTION

An object of the present invention is to provide a control system for a clutch which operates to detect trouble of a vehicle speed signal system.

Another object of the present invention is to provide a control system having a fail-safe system in order to maintain driving of a vehicle during the trouble.

The other objcts and features of this invention will become understood from the following description with reference to the accompanying drawings.

BRIEF DESCRIPTION OF DRAWINGS

FIGS. 2a and 2b show a block diagram of a control unit according to the present invention;

DETAILED DESCRIPTION OF THE PREFERRED EMBODIMENT

Figure 1:
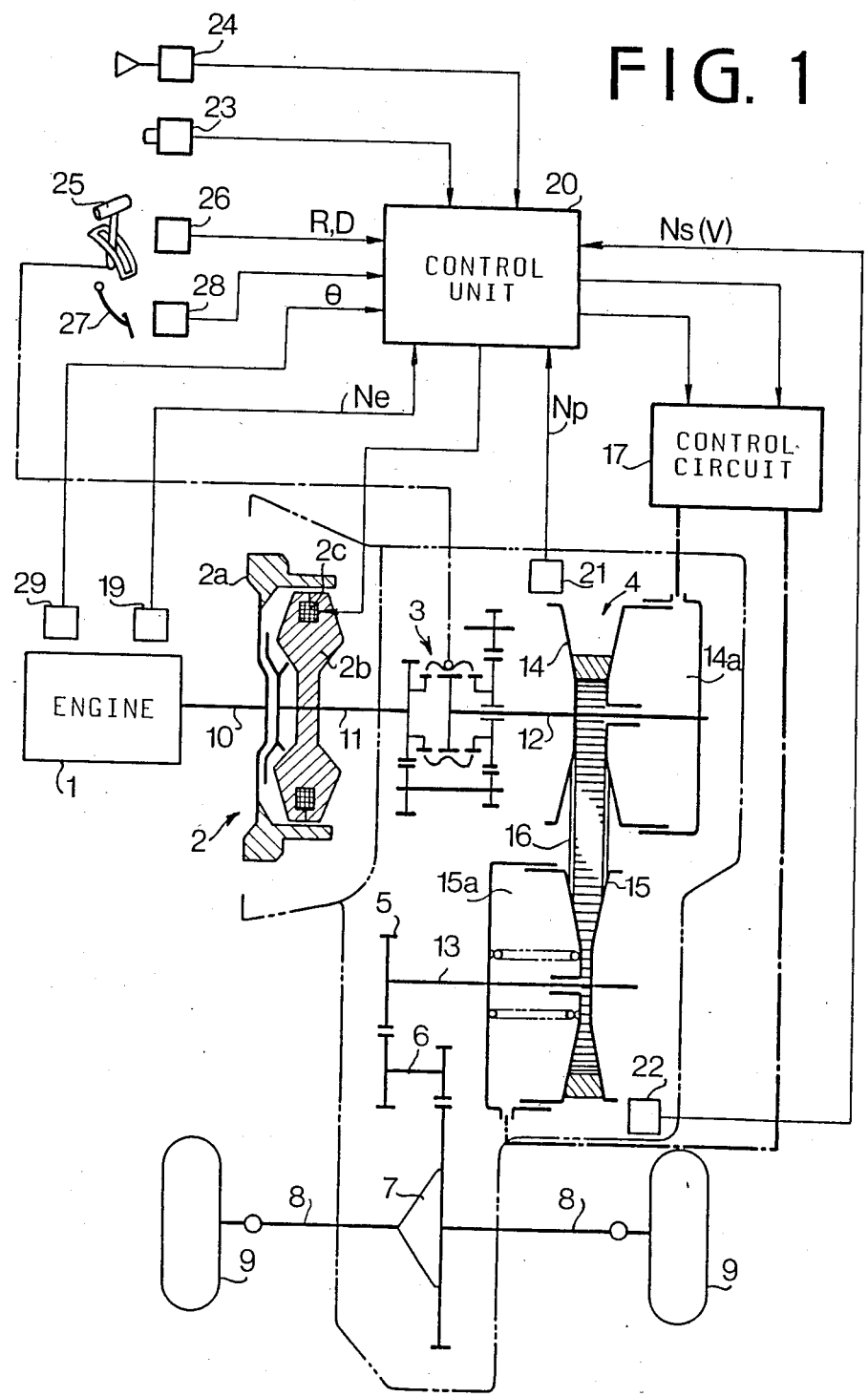
FIG. 1 is a schematic illustration of a system for controlling an electromagnetic clutch for a motor vehicle.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive automatic transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to the crankshaft 10 of the engine 1, a driven member 2b secured to an input shaft 11 of the transmission 4, and a magnetizing coil 2c provided in the driven member 2b. Magnetic powder material is provided in a gap between the drive member 2a and driven member 2b. When the magnetizing coil 2c is excited by the clutch current, the driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive automatic transmission 4, the selector mechanism 3 is provided between the input shaft 11 and a main shaft 12. The selector mechanism 3 is provided with a synchromesh mechanism comprising gears, hub, and a sleeve for connecting the input shaft 11 and the main shaft 12 to selectively provide a driving position (D-range) and a reverse driving position (R-range).

The continuously variable belt-drive automatic transmission 4 has the main shaft 12 and the output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. Hydraulic cylinders 14a and 15a are communicated with an oil hydraulic control circuit 17. The hydraulic control circuit 17 is responsive to vehicle speed, engine speed and throttle valve position for controlling the amount of oil supplied to the cylinders 14a and 15a. The pulleys 14 and 15 are operated by compressive forces in the cylinders so that the running diameter of belt 16 is varied to infinitely change the transmission ratio.

An electronic control system for the clutch 2 and the belt-drive automatic transmission 4 has an engine speed sensor 19, and rotating speed sensors 21 and 22 for respectively sensing speeds of the drive pulley 14 and the driven pulley 15. A choke switch 24 produces an output signal when a choke valve of the engine 1 is closed, and an air conditioner switch 23 produces an output signal a during the operation of an air conditioner. A selector lever 25 connected to the selector mechanism 3 is provided with a select position sensor 26 for sensing a drive position D and a reverse position R. An accelerator pedal switch 28 is provided for sensing the depression of an accelerator pedal 27, and a throttle position sensor 29 is provided.

Output signals of the sensors and pulses of the switches are applied to an electronic control unit 20 which produces a clutch current control signal to the clutch 2 and a control signal for controlling the transmission ratio (i) of the transmission and a line pressure control signal to the control circuit 17.

Figure 2B:
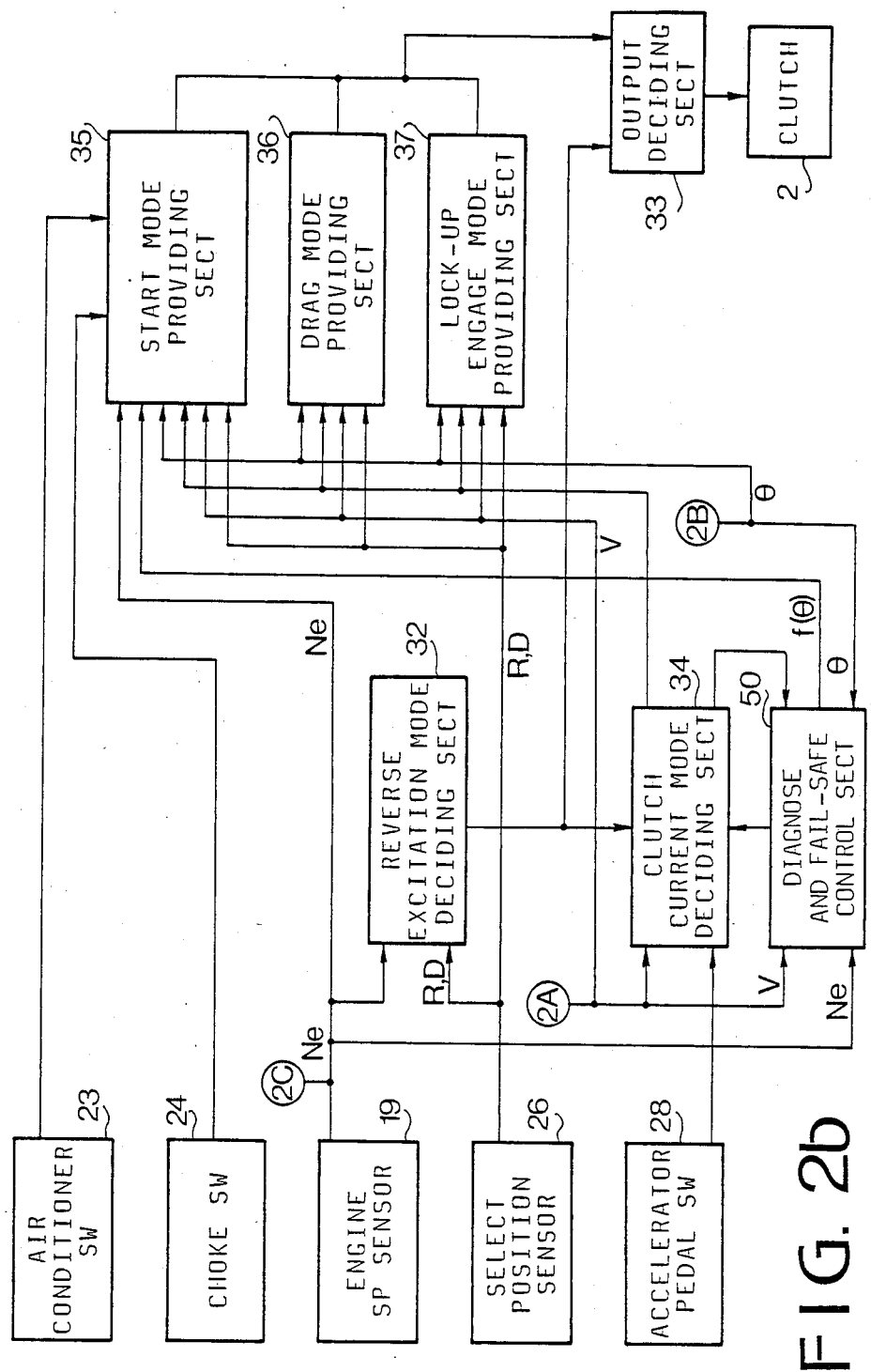

Referring to FIGS. 2a and 2b showing the control unit 20 of FIG. 1, a transmission ratio changing speed control section 30 is applied with a drive pulley speed signal $N_P$ of the sensor 21, driven pulley speed signal $N_s$ of the sensor 22, and throttle position signal $\theta$ of the sensor 29 to produce the transmission ratio control signal dependent on a transmission ratio changing speed (rate) di/dt. The driven pulley speed signal $N_s$ comprises pulses and corresponds to vehicle speed V. A line pressure control section 31 is applied with an engine speed signal Ne of the sensor 19, throttle position signal $\theta$ of the sensor 29, and an actual transmission speed ratio signal i ($N_s N_P$) of the transmission ratio changing speed control section 30 to produce the line pressure control signal dependent on a desired line pressure. These control signals are applied to the control circuit 17 to control the transmission ratio and line pressure of the transmission 4.

A reverse excitation mode deciding section 32 is applied with the engine speed signal Ne of the sensor 19 and drive position signal of the select position sensor 26. When the engine speed Ne is below 300 rpm, or the selector lever 25 is at a neutral position (N-range) or a parking position (P-range), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from driven pulley speed sensor 22 for deciding driving conditions such as starting mode to produce output signals. The output signals are applied to a start mode providing section 35, drag mode providing section 36, and clutch lock-up engage mode providing section 37.

The start mode providing section 35 decides clutch current of a starting characteristic dependent on the engine speed Ne at an ordinary start or at closing of the choke switch 24 or air conditioner switch 23. The starting characteristic is corrected by the throttle position signal $\theta$, vehicle speed signal V, and driving position signals of the D-range and R-range.

The drag mode providing section 36 decides a small drag current when the accelerator pedal 27 is released at a low speed in each drive position for providing a drag torque to the clutch 2 for smooth start of the vehicle.

Figure 3:
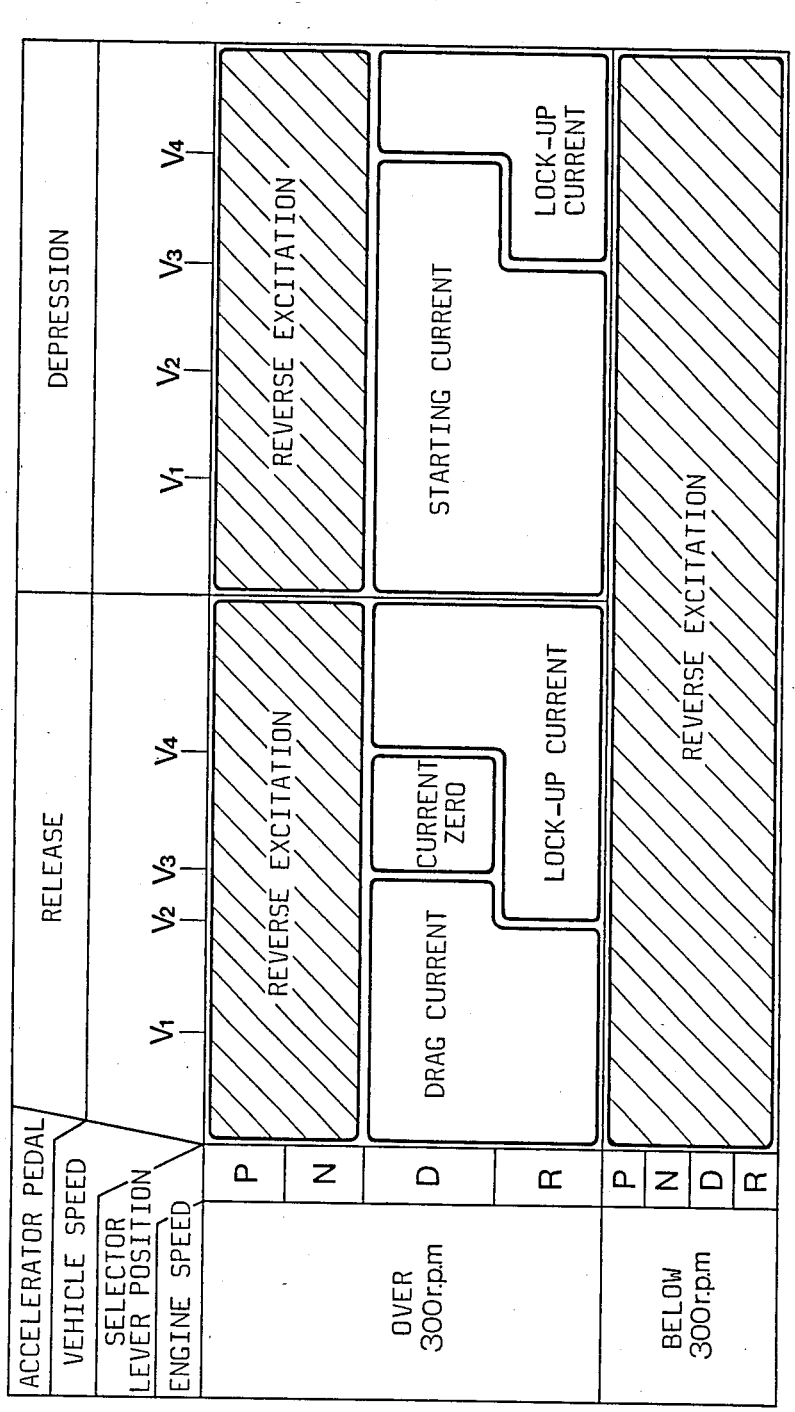
FIG. 3 is a graph showing regions of various modes.

The clutch lock-up engage mode providing section 37 decides a lock-up current in response to the vehicle speed signal V and throttle position signal $\theta$ at the drive position or the reverse position for entirely engaging the clutch 2. Outputs of sections 35, 36 and 37 are applied to the output deciding section 33 to control the clutch current. A range of each mode is shown in FIG. 3.

A diagnose and fail-safe control section 50 is provided for detecting a failure of a vehicle speed signal system and for controlling a fail-safe system when the failure is detected to prevent the aggravation of driving characteristics.

Figure 4:
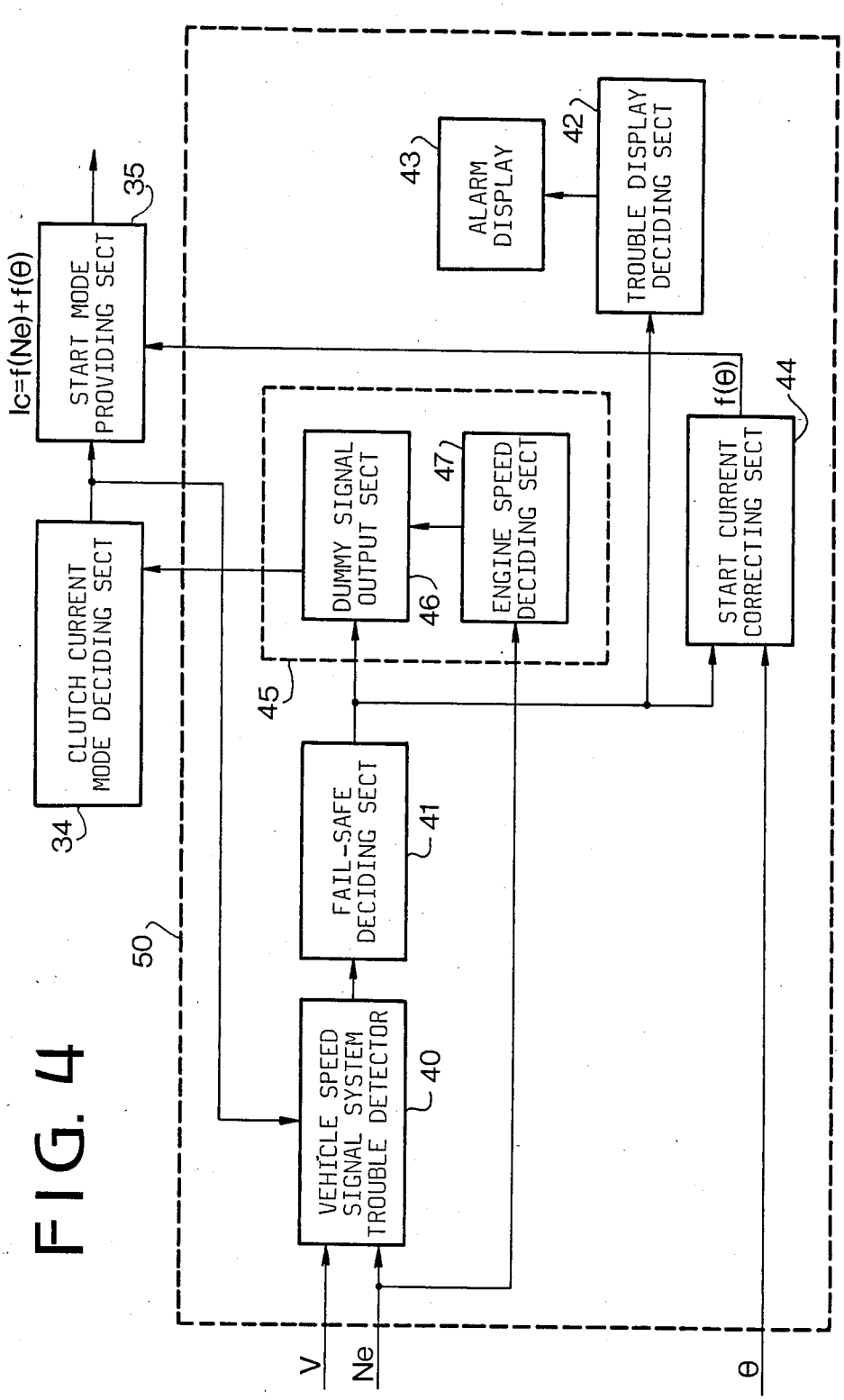
FIG. 4 is a block diagram of a main part of the system according to the present invention.

Referring to FIG. 4, the diagnose and fail safe control section 50 is provided with a vehicle speed signal system trouble detector 40 which is applied with output signals of the clutch current mode deciding section 34, engine speed Ne of the sensor 19, and vehicle speed V of the sensor 22. When the detector 40 detects an abnormal vehicle speed signal Va, a trouble signal is applied to a fail-safe deciding section 41. When the trouble signal continues for a predetermined period, the fail safe deciding section 41 produces a fail-safe signal.

The fail-safe signal is applied to an alarm display 43 through a trouble display deciding section 42.

The fail-safe signal is further applied to a start current correcting section 44 which is applied with a throttle position signal $\theta$ to calculate a correcting value f($\theta$) in response to the throttle valve opening degree. The correcting value f($\theta$) is applied to the start mode providing section 35. At the section 35, the clutch current Ic is given by a coefficient of engine speed f(Ne) and the correcting value f($\theta$), that is corrected by the calculation $Ic = f(Ne) + f(\theta)$, so as to prevent the clutch from slipping during the driving after the start of the vehicle.

A mode changing section 45 is provided for determining a fail-safe flag set and produces an output signal which is applied to the clutch current mode deciding section 34. The mode changing section 45 comprises a dummy signal output section 46 which is applied with the fail-safe signal from the fail-safe deciding section 41 and a engine speed deciding section 47 applied with the engine speed signal Ne. An output signal of the section 47 is applied to the section 46. When the fail-safe signal is applied to the section 46 and the engine speed is higher than a predetermined speed N2 (for example 1300 rpm), the section 46 produces a dummy signal resembling the depression of the accelerator pedal. The dummy signal is applied to the clutch current mode deciding section 34 to maintain the start mode, even if the accelerator pedal is released.

Figure 5A:
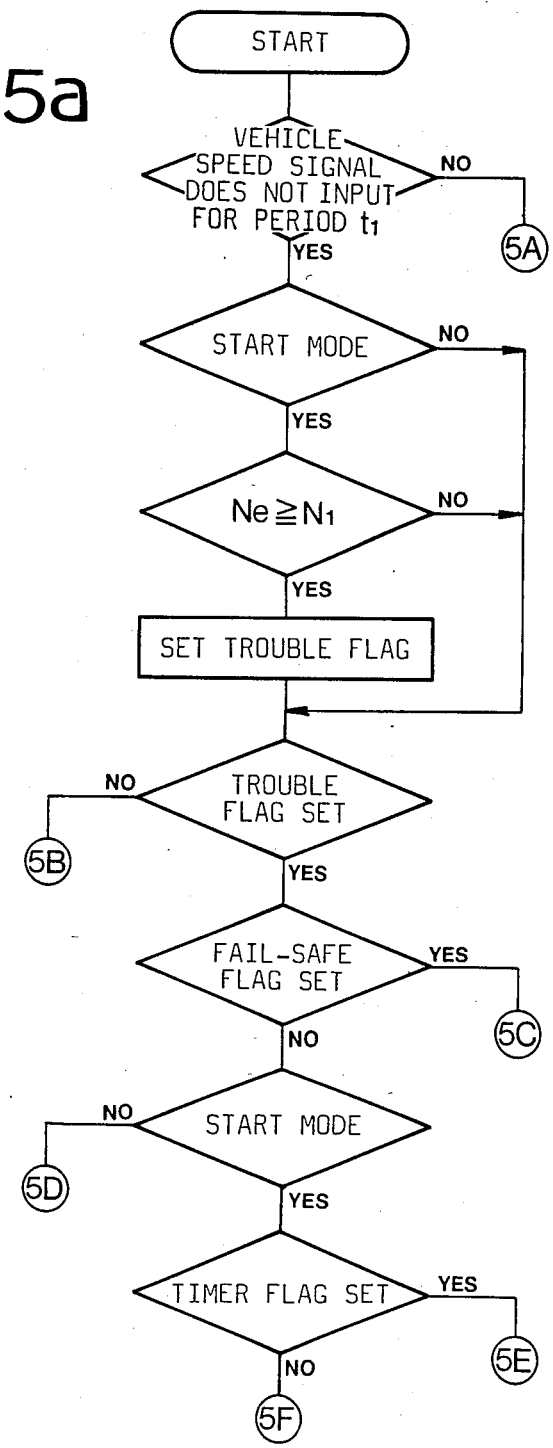
FIGS. 5a to 5c are flow charts showing the operation of the system.
Figure 5B:
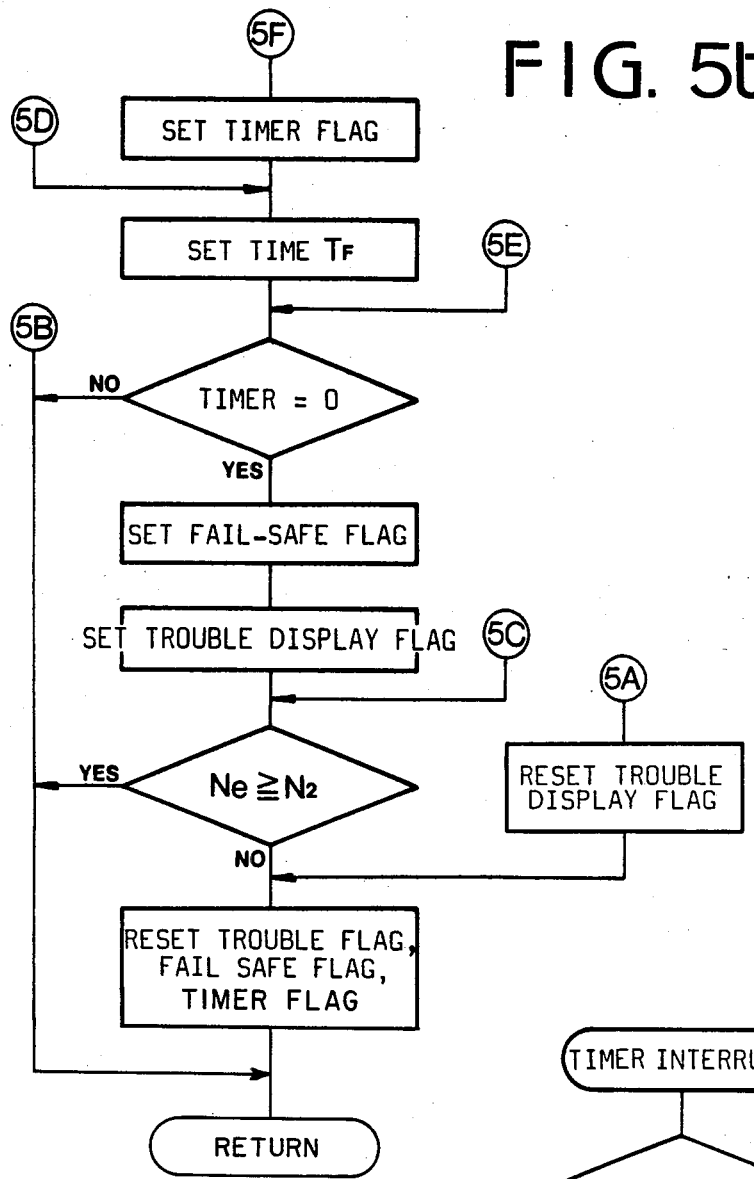

The operations of the detector 40 and section 41 of the control system will be described with reference to FIGS. 5a to 5c. When the vehicle speed pulse signal V is applied to the section 50 for a predetermined period t1, a normal driving condition is decided so that all flags are reset.

In the start mode, when the vehicle speed pulse signal is not applied to the detector 40 for the period t1, and the engine speed is above a predetermined speed $N_1$ (for example 1500 rpm), a trouble flag is set. When the trouble flag is set, it is determined whether the fail-safe flag is to be set or not. In the case if the fail-safe flag is reset and if the system control mode is other than the start mode, a predetermined period $T_F$ is set in a timer. In the case if the system is in the start mode, the predetermined period TF is set after a timer flag is set.

Figure 5C:
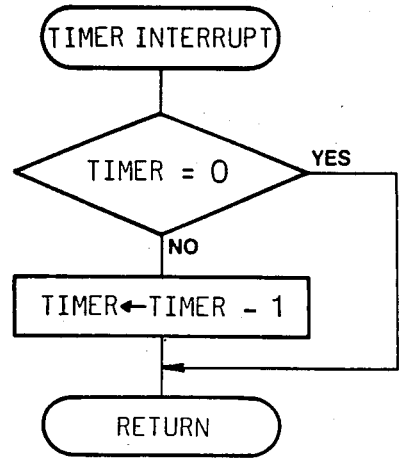

As shown by an interrupt routine program in FIG. 5c, the set time in the timer is decreased up to zero by a decrement at every predetermined interval. When the timer goes to zero, that is, the start mode continues more than the predetermined period $T_F$ after the set the of trouble flag, the fail-safe flag and trouble display flag are set. However, in this state, if the vehicle speed pulse signal is applied in the detector 40, all flags are reset. Thus, the normal operation is executed.

In the trouble state, the alarm display 43 indicates the alarm. In accordance with the set condition of the fail-safe flag, the start current correcting section 44 produces the correcting signal $f(\theta)$ to correct the clutch current Ic at the start mode providing section 35. Accordingly, during the drive of the vehicle after starting, the start mode is maintained by the clutch current mode deciding section 34 in spite of vehicle speed being zero. In this state, the clutch torque is increasingly corrected in response to the depression of the accelerator pedal in the low engine speed range so that the engagement of the clutch is maintained without slipping.

Further, the mode changing section 45 produces an output signal, when engine speed is higher than the set speed N2. In response to the output signal of the section 47 and the fail-safe signal, the dummy signal output section 46 produces a dummy signal. The dummy signal is applied to the clutch current mode deciding section 34 to maintain the start mode. Thus, the clutch current flows, even if the accelerator pedal is released, thereby effecting the engine braking.

When the engine speed Ne decreases below the engine speed $N_2$, the trouble flag, timer flag and fail-safe flag are reset to stop producing the dummy signal. The system is changed to the drag mode at the section 34. Thus, the drag mode current flows in the coil of the clutch to disengage the clutch.

In accordance with the present invention, trouble or faults in the vehicle speed signal system are rapidly and properly detected at the start of the vehicle. Further, the fail-safe system is provided for correcting the clutch torque in accordance with the depression of the accelerator pedal with keeping the predetermined engine speed. Therefore, the deterioration of the clutch and the aggravation of driving characteristics are prevented.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a system for controlling an electromagnetic clutch for a motor vehicle having an engine with a throttle valve operatively connected to an accelerator pedal, a transmission operatively transmitting the power of the engine through the clutch to wheels of the vehicle, a vehicle speed sensor for producing a vehicle speed signal in accordance with the vehicle speed, an engine speed sensor for producing an engine speed signal in accordance with the engine speed, an accelerator pedal switch for sensing depression of the accelerator pedal for producing an accelerator signal, a throttle position sensor for sensing opening degree of the throttle valve and for producing a throttle signal in accordance with the opening degree of the throttle valve, start mode providing means for providing a start mode for producing a start clutch current, at the depression of the accelerator pedal, which increases with increase of speed of the engine, and which is supplied to the electromagnetic clutch, drag mode providing means for providing a drag mode for producing a drag clutch current which is supplied to the electromagnetic clutch to produce a drag torque on the electromagnetic clutch, lock-up mode providing means for providing a lock-up mode for producing a lock-up clutch current which is supplied to the electromagnetic clutch to lock-up the electromagnetic clutch, and mode deciding means for deciding one of the modes operatively responsive to the accelerator signal, vehicle speed signal, and engine speed signal, the improvement in the system comprising:

trouble signal producing means responsive to the vehicle speed sensor, engine speed signal and an output signal of the mode deciding means for producing a trouble signal upon absence of the vehicle speed signal from the vehicle speed sensor for a first predetermined period in the start mode at engine speed higher than a first predetermined speed;

fail-safe signal producing means responsive to the trouble signal for producing a fail-safe signal when the trouble signal continues for a second predetermined period;

engine speed deciding means responsive to the engine speed signal for producing an output signal when the engine speed is higher than a second predetermined speed;

dummy signal producing means responsive to the fail-safe signal and the output signal of the engine speed deciding means for producing a dummy signal; and said mode deciding means responsive to the dummy signal for deciding the start mode in spite of releasing of the accelerator pedal so as to provide an engine brake effect when the accelerator pedal is released.

2. The system according to claim 1, further comprising start current calculating means responsive to the fail-safe signal and throttle signal for calculating a correcting value in accordance with the throttle signal for producing a correcting signal; and said start mode providing means responsive to the correcting signal for correcting the clutch current so as to prevent slipping of the electromagnetic clutch during driving in accordance with driving conditions after start of the vehicle.

3. The system according to claim 1, further comprising display means responsive to the fail-safe signal for displaying failure of the vehicle speed sensor so as to enable rapid and proper warning of the failure.

4. The system according to claim 1, wherein the first predetermined speed is higher than the second predetermined speed.

5. The system according to claim 1, wherein said mode deciding means is for changing the start mode, providing in response to the dummy signal during release of the accelerator pedal, to the drag mode in response to absence of the dummy signal when the engine speed decreases below the second predetermined speed during absence of the vehicle speed signal.

* * * * *